T. POWELL.
Netting for Unloading Wagons.
No. 199,661. Patented Jan. 29, 1878.
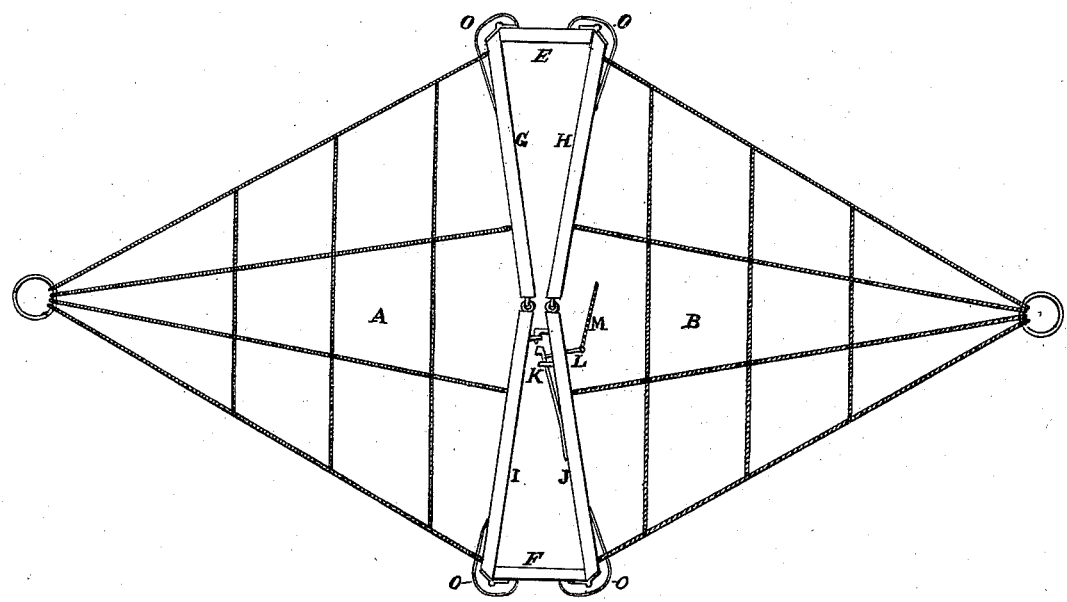
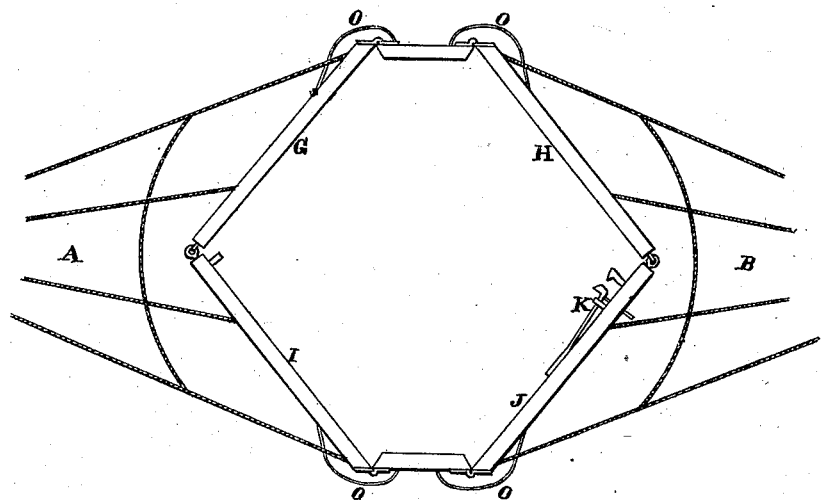

UNITED STATES PATENT OFFICE.

THOMAS POWELL, OF STOCKTON, CALIFORNIA.

IMPROVEMENT IN NETTING FOR UNLOADING WAGONS.

Specification forming part of Letters Patent No. 199,661, dated January 29, 1878; application filed October 22, 1877.

*To all whom it may concern:*

Be it known that I, THOMAS POWELL, of Stockton, county of San Joaquin and State of California, have invented an Improved Netting for Unloading Wagons; and I do hereby declare the following to be a full, clear, and exact description thereof, reference being had to the accompanying drawings.

My invention relates to an improved arrangement for connecting and disconnecting the two halves of the false bottom or netting, which is placed in the bottom of a wagon before it is loaded, so that the load can be lifted bodily and dumped at one operation.

Referring to the drawings, A B represent the two parts of a netting or other false bottom, such as is placed over the bottom of a header-wagon for receiving and handling the load bodily. Each half of the netting I make triangular in form, and I then connect one side of one netting with one side of the other, so as to form a diamond-shaped netting or false bottom, as represented. This form is more convenient than the usual square netting, because I have only two corners to gather together above the load, and the netting is easier disposed in the bottom of the wagon. To connect these two parts together, I construct a flexible frame of hinged bars, as represented at Figure 1. This frame consists of two short bars, E F, and four long bars, G H I J.

The edge of the netting on each side is attached to the long bars, while the short bars form the connection of the side ropes. To close the netting the connected ends of the long bars are brought together midway between the short bars E F, so that the portion of the frame on each side of the meeting ends of the bars assumes the form of an isosceles triangle.

A latch, K, is attached to the meeting end of one of the long bars G, which engages with a catch on the opposite bar I, so that when the frame is thus closed together the latch fastens it in its closed position till it is released. A pull-bar, L, which is operated by drawing on a rope, M, releases the latch in the usual way when it is desired to dump the load contained in the netting.

When this is done the hinged frame opens out so as to form a hexagonal figure, through which the load will drop without entirely separating the two parts of the netting. In other words, the frame is composed of hinged bars, which can be closed together so as to retain the load, but which will open out when the latch is detached, so as to form an opening, through which the load can pass.

The connecting-frame can be made in any number of parts or hinged bars, connected with a latch or fastening to keep it in its closed position.

I prefer the arrangement herewith shown, because it is simple, cheap, and easily operated. When the frame is opened the load drops readily through the opening without the entire separation of the parts of the netting, so that the parts can be easily connected after the load has been dropped.

This arrangement prevents the possibility of injury to bystanders, as often happens with the ordinary net, when the lower ends of the parts fly outward by the dropping of the load.

In the present instance I have represented a spring, O, applied at the outer hinge-joints. This spring will be strong enough to close the side bars without other force being applied when no load is held in the net.

The weight of the load when the latch is released is sufficient to open the frame automatically and let the load drop out. Any suitable arrangement of latch or fastening can be used for securing the hinged frame in its crossed position.

The short bars E F might be dispensed with and the outer ends of the long bars hinged together. This would completely close the opening, but would reduce the size of the opening for the load to drop through.

Having thus described my invention, what I claim, and desire to secure by Letters Patent, is—

A connection for the two parts, A B, of an unloading net, consisting of four or more hinged bars, G H I J, in combination with a latching device, substantially as above specified.

In witness whereof I have hereunto set my hand and seal.

THOMAS POWELL. [L. S.]

Witnesses:
   JAS. M. McCARTY,
   W. E. SAUNDERS.